(12) United States Patent
Chiang et al.

(10) Patent No.: US 9,450,516 B2
(45) Date of Patent: Sep. 20, 2016

(54) INVERTER SYSTEM FOR ENERGY-STORING MICROGRID AND CONTROLLING METHOD THEREOF

(71) Applicant: NATIONAL CHUNG SHAN INSTITUTE OF SCIENCE AND TECHNOLOGY, Longtan Township, Taoyuan County (TW)

(72) Inventors: Hsuang-Chang Chiang, Taipei (TW); Chao-Tsung Ma, Miaoli (TW); Kuo-Kuang Jen, Hsinchu (TW); Yi-Lun Chen, Yilan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 344 days.

(21) Appl. No.: 14/198,516

(22) Filed: Mar. 5, 2014

(65) Prior Publication Data
US 2015/0256103 A1    Sep. 10, 2015

(51) Int. Cl.
*H02J 1/10*    (2006.01)
*H02M 7/493*    (2007.01)

(52) U.S. Cl.
CPC ........... *H02M 7/493* (2013.01); *Y10T 307/352* (2015.04)

(58) Field of Classification Search
CPC ..................... H02M 7/493; Y10T 307/352
See application file for complete search history.

(56) References Cited

U.S. PATENT DOCUMENTS

| | | | |
|---|---|---|---|
| 2009/0326724 A1* | 12/2009 | Lasseter | H02J 3/382 700/287 |
| 2010/0292853 A1* | 11/2010 | McDonnell | H02J 3/34 700/287 |
| 2014/0005846 A1* | 1/2014 | Boo | G05B 13/02 700/291 |

\* cited by examiner

*Primary Examiner* — Daniel Cavallari
(74) *Attorney, Agent, or Firm* — Anova Law Group, PLLC

(57) ABSTRACT

The present invention relates to an inverter system for energy-storing microgrid and a controlling method thereof, wherein the inverter system for energy-storing microgrid is integrated with a detecting module, a controlling and processing module, a visual resistor algorithmic processor, and a PWM signal generator. Moreover, the controlling and processing module is installed with a power-voltage reducing function and a reactive power-frequency reducing function for making the controlling and processing module be able to properly distribute the intensity and output ratio of all the output currents of the inverters according to the charge states of battery modules and load currents. Therefore, the current supply of each of the parallel connected inverters in the inverter system can be automatically distributed and modulated for effectively providing necessary electric power to each of connected loads, respectively.

11 Claims, 6 Drawing Sheets

INVERTER SYSTEM FOR ENERGY-STORING MICROGRID AND CONTROLLING METHOD THEREOF

BACKGROUND OF THE INVENTION

1. Field of the Invention

The present invention relates to the technology field of inverter systems, and more particularly to an inverter system for energy-storing microgrid and controlling method thereof.

2. Description of the Prior Art

Inverter is used for converting DC energy to a high-quality AC power. For establishing an inverter system having high capability and capable of providing high-quality AC power, it carries out the establishment by parallel connecting multi inverters having small capability. However, because the unequal distribution of the inverter currents always occur in the high-capability inverter system established by parallel connecting multi inverters, how to solve the problem of the unequal distribution of the inverter currents has been became the most important issue.

Currently, the controlling methods for parallel inverter system are mainly divided into active current distribution method and voltage-reducing method. When using the active current distribution method to control the parallel inverter system, each inverter current of the parallel inverters would track a reference current, such that each of the parallel inverters are equivalent to a current source, so as to steady the output currents of the parallel inverter system. However, since the parallel inverters in the parallel inverter system are coupled to the reference current source via transmission lines, the transmitted reference currents in the transmission lines would subject to noise interference resulted from over-long transmission lines, and that would impact the stability and reliability of the parallel inverter system.

Inheriting to above descriptions, both the problems of noise interference and signal delay produced by the over-long transmission lines can be solved by way of noise filter and signal process; however, it would cause the inverter system unable to work normally when the transmission lines failure or break down, and that may be the primary concern as the inverter system is applied. On the other hand, the primary drawback of the voltage-reducing method is that the capacitance state of the input-end battery modules of the inverter system does not be considered when the method is used to distribute the current supply of each of the battery modules, and that would reduce lifetime of certain battery modules and eventually result in the breakdown of the battery modules.

Accordingly, in view of the conventional active current distribution method and voltage-reducing method still including drawbacks and shortcomings, the inventor of the present application has made great efforts to make inventive research thereon and eventually provided an inverter system for energy-storing microgrid and controlling method thereof.

SUMMARY OF THE INVENTION

The primary objective of the present invention is to provide an inverter system for energy-storing microgrid and controlling method thereof, wherein the inverter system for energy-storing microgrid is integrated with a detecting module, a controlling and processing module, a visual resistor algorithmic processor, and a PWM signal generator. Moreover, the controlling and processing module is installed with a power-voltage reducing function and a reactive power-frequency reducing function for making the controlling and processing module be able to properly distribute the intensity and output ratio of all the output currents of the inverters according to the charge states of battery modules and load currents. Therefore, the current supply of each of the parallel connected inverters in the inverter system can be automatically distributed and modulated for effectively providing necessary electric power to each of connected loads, respectively.

Accordingly, to achieve the primary objective of the present invention, the inventor of the present invention provides an inverter system for energy-storing microgrid, comprising:

at least one inverter, coupled between at least one battery module and at least one load;

at least one detecting module, coupled to the at least one inverter for detecting at least one output current of the at least one inverter;

a controlling and processing module, coupled to the at least one detecting module for receiving the output current, wherein the controlling and processing module calculates a command reference voltage of the output current by using a power-voltage reducing function, and the controlling and processing module simultaneously calculating a command reference frequency of the output current by using a reactive power-frequency reducing function;

a sine wave generator, coupled to the controlling and processing module for receiving the command reference frequency, so as to generate a reference sine wave signal according to the command reference frequency;

a first multiplier, coupled to the controlling and processing module and the sine wave generator for receiving the command reference voltage and the reference sine wave signal, so as to treat the command reference voltage and the reference sine wave signal with a multiplication process, and then output a primary reference output voltage;

a visual resistor algorithmic processor, coupled to the at least one load and the at least one battery module, and used for processing at least one load current received from the at least one load and at least one charge state current received from the battery module, so as to output a secondary reference output voltage;

a first voltage combining processor, coupled to the visual resistor algorithmic processor and the first multiplier for receiving the primary reference output voltage and the secondary reference voltage, so as to combine the primary reference output voltage and the secondary reference output voltage, and then output a reference output voltage;

a second voltage combining processor, coupled to the first voltage combining processor and the controlling and processing module in order to receive the reference output voltage and the command reference voltage, and combine aforesaid two voltage to a combination voltage;

a proportional amplifier, coupled to the second voltage combining processor, and used for converting the combination voltage to a reference current;

a current combining processor, coupled to the load and the proportional amplifier for combining the load current and the reference current to a combination current; and a PWM signal generator, coupled to the proportional amplifier and the load and used for generating a PWM driving signal according to the combination current, so as to drive at least one switch circuits of the at least one inverter.

Moreover, in order to achieve the primary objective of the present invention, the inventor of the present invention further provides a controlling method for inverter system, comprising following steps:

(1a) receiving at least one charge state current ISOC from at least one battery module 2 and at least one load current IL from at least one load 3 so as to calculate a secondary reference output voltage Von_S* by way of a visual resistor algorithm, and then proceeding to step (4);

(1a) receiving at least one charge state current from at least one battery module and at least one load current from at least one load, so as to calculate a secondary reference output voltage by way of a visual resistor algorithm, and then proceeding to step (4);

(1) detecting and receiving an output current form at least one inverter disposed between the at least one battery module and the at least one load;

(2) calculating a command reference voltage of the output current by using a power-voltage reducing function, and then proceeding to step (3);

(2a) calculating a command reference frequency of the output current by using a reactive power-frequency reducing function, and then proceeding to step (3);

(3a) a sine wave generator generating a reference sine wave signal according to the command reference frequency;

(3) multiplying the command reference voltage with the reference sine wave signal for obtaining a primary reference output voltage;

(4) combining the primary reference output voltage and the secondary reference output voltage for obtaining a reference output voltage;

(5) combining the reference output voltage and the command reference voltage for obtaining a combination voltage, and then converting the combination voltage to a reference current by using a proportional amplifier;

(6) a PWM signal generator generating a PWM driving signal according to the reference current and the load current, so as to drive at least one switch circuits of the at least one inverter for controlling the intensity of the output current of the at least one inverter.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an inverter system for energy-storing microgrid and controlling method thereof according to the present invention, embodiments of the present invention will be described in detail with reference to the attached drawings hereinafter.

Figure 1:
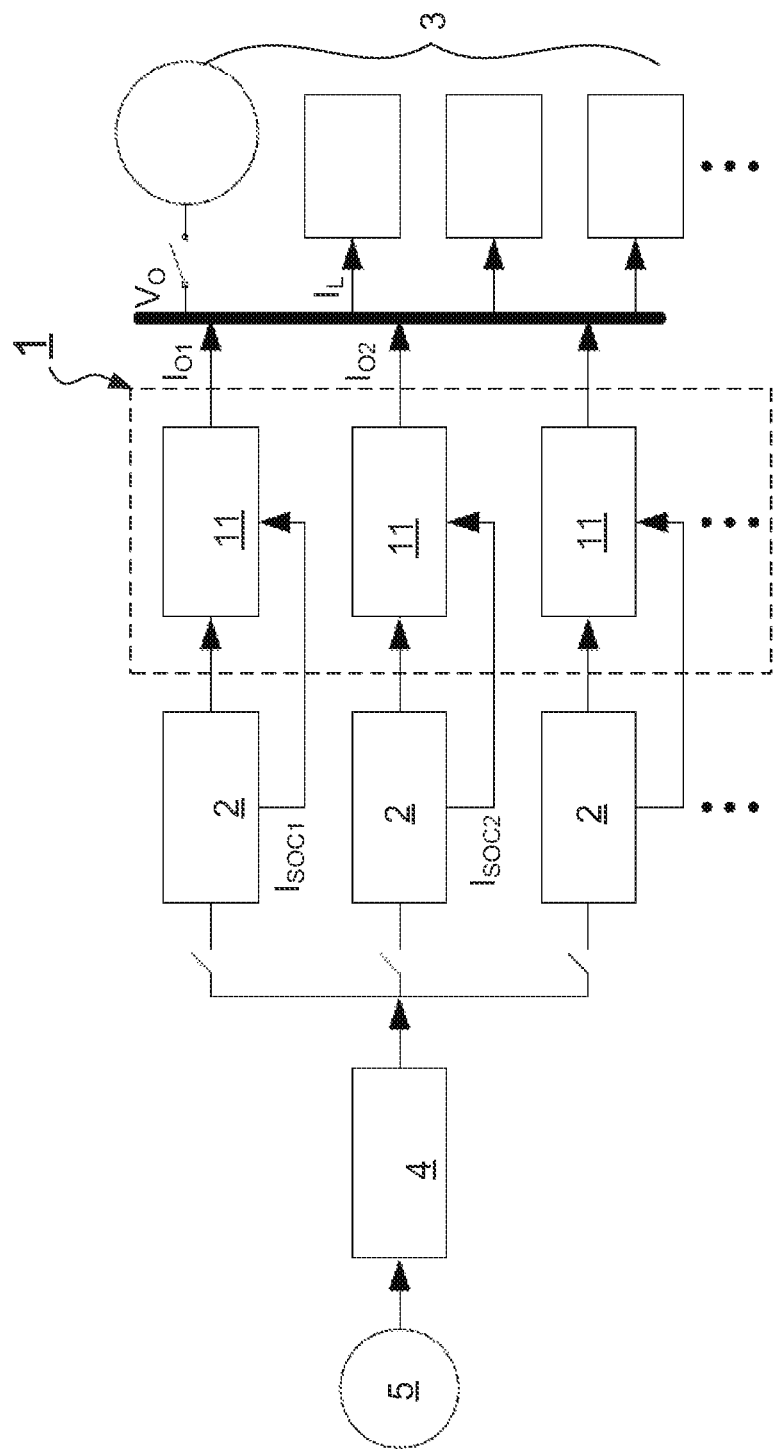
FIG. 1 is a block diagram of an inverter system for energy-storing microgrid according to the present invention.

With reference to FIG. 1, which illustrates a block diagram of an inverter system for energy-storing microgrid according to the present invention. As shown in FIG. 1, the inverter system 1 for energy-storing microgrid of the present invention mainly includes a plurality of inventers parallel connecting to each other. The inverters 11 are coupled between a plurality of battery modules 2 and a plurality of loads 3. In addition, the battery modules 2 are further coupled to at least one electric power converter 4, which is used for converting at least one renewable energy source provided by at least one renewable energy generating system 5 to electric power, and then storing the electric power in the battery modules 2. In the present invention, the aforesaid renewable energy generating system 5 mentioned above can be wind power generating system, thermal power generating system, hydroelectric power generating system, solar power generating system, power generation system of recycling waste food, biomass power generating system, or geothermal power generating system. Moreover, the load 3 mentioned above can be microgrid, motor or energy storage device.

Figure 2:
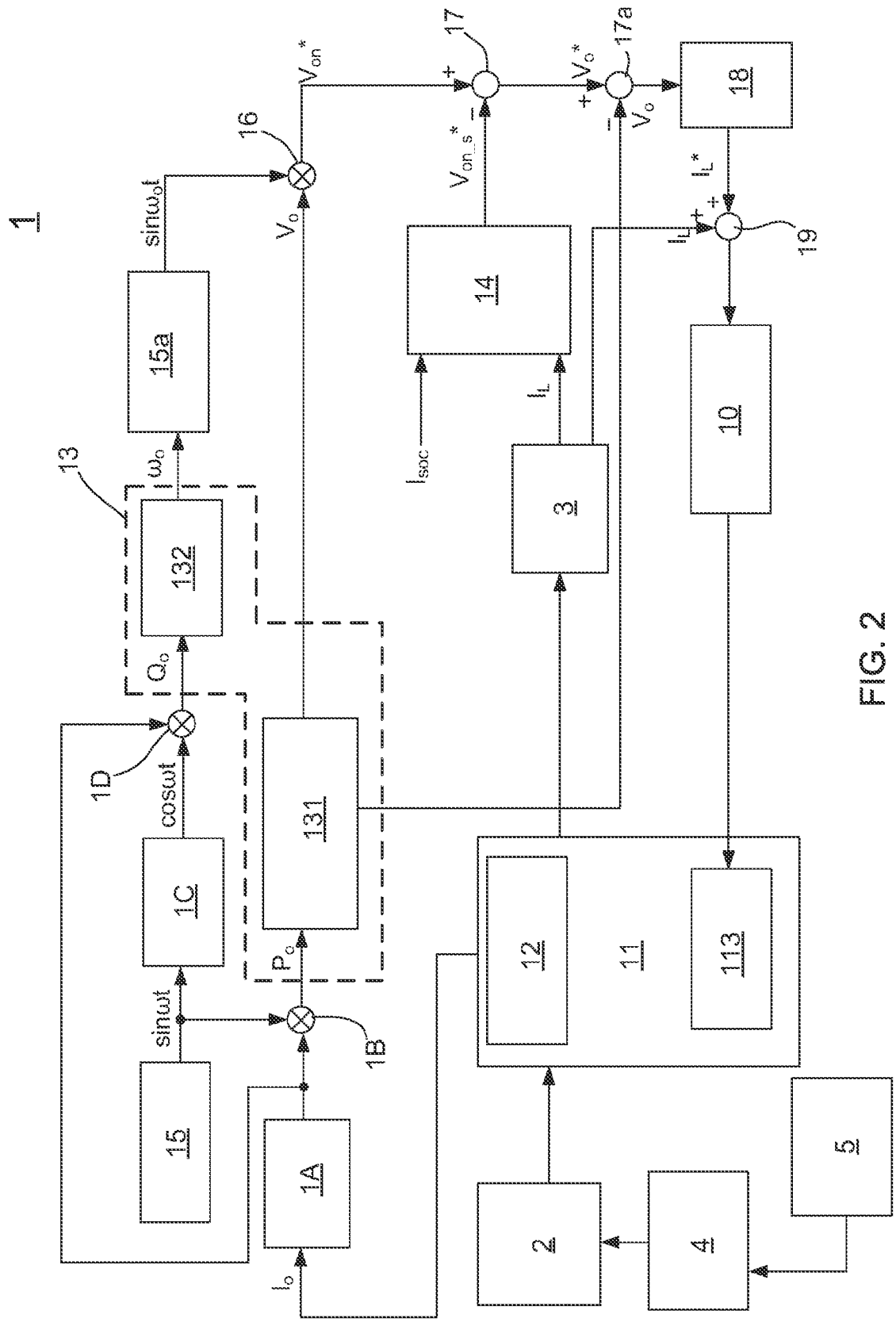
FIG. 2 is a schematic controlling framework of the inverter system for energy-storing microgrid according to the present invention.
Figure 3A:
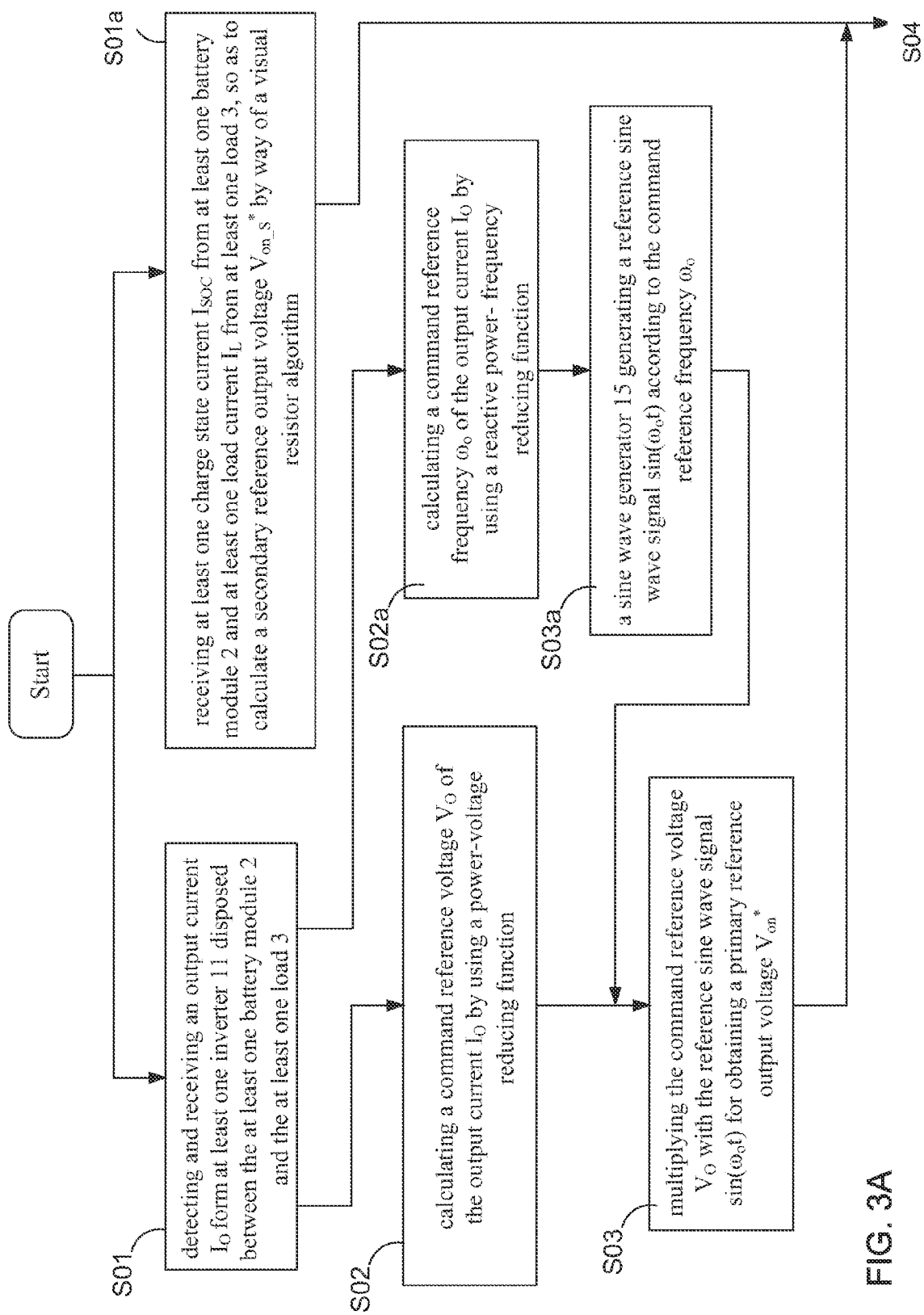
FIG. 3A and FIG. 3B show flow charts of a controlling method for inverter system according to the present invention.
Figure 3B:
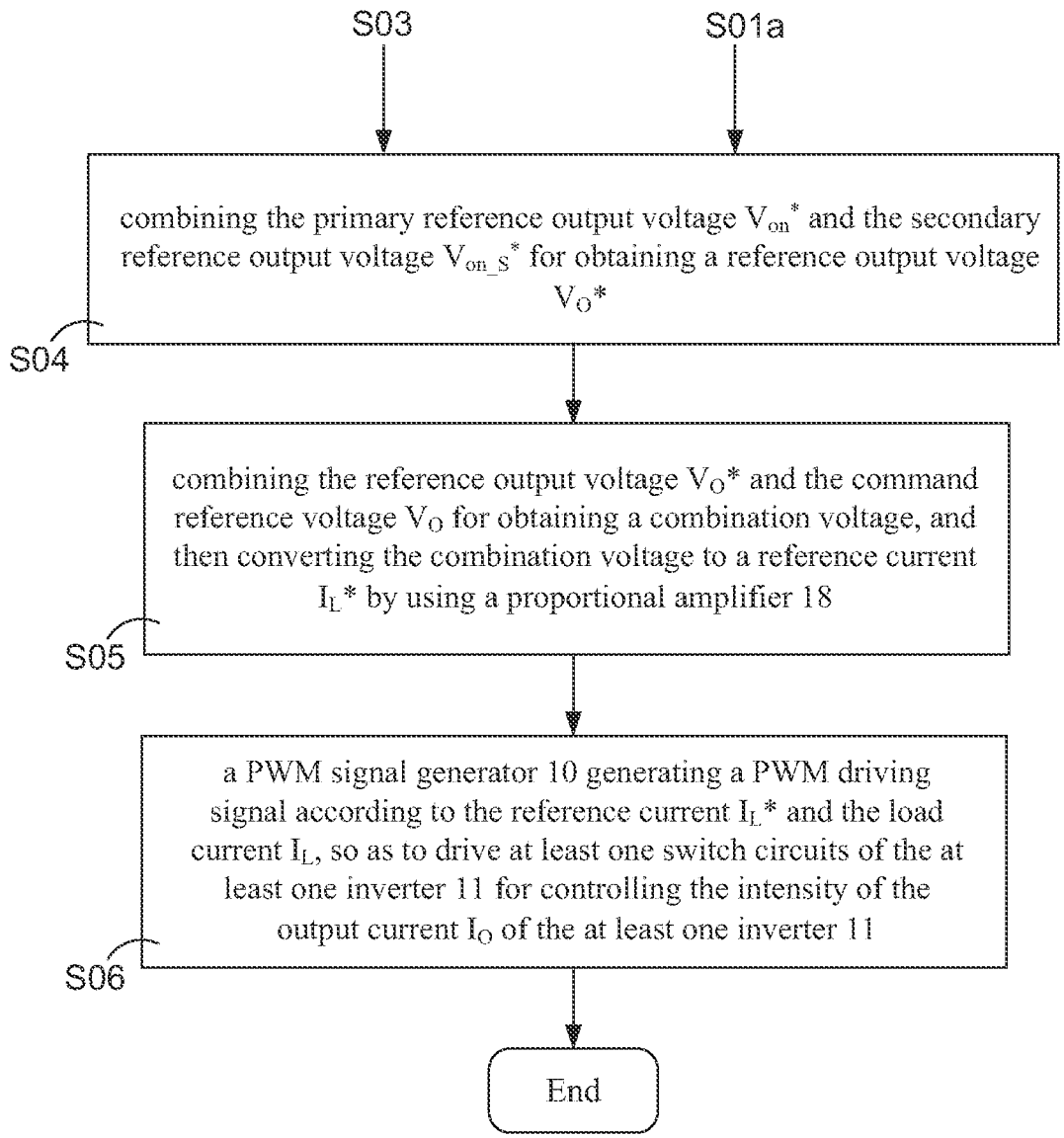

Continuously referring to FIG. 1, and please simultaneously refer to FIG. 2, there is shown a schematic controlling framework of the inverter system for energy-storing microgrid. As shown in FIG. 1 and FIG. 2, the inverter system 1 for energy-storing microgrid of the present invention further includes: at least one detecting module 12, a controlling and processing module 13, two sine wave generators (15, 15a), a low pass filter 1A, three multipliers (16, 1B, 1D), a visual resistor algorithmic processor 14, two voltage combining processors (17, 17a), a proportional amplifier 18, a current combining processor 19, and a PWM signal generator 10. In which, the detecting module 12 is coupled to the inverters 11 for detecting at least one output current $I_O$ of the inverters 11, and then the output current $I_O$ is treated with a filtering process through the low pass filter 1A coupled to the inverters 11.

As FIG. 1 and FIG. 2 show, the low pass filter 1A transmits the output current $I_O$ to multiplier 1B and multiplier 1D, therefore the multiplier 1B coupled to the sine wave generator 15 would treat a sine wave signal $\sin(\omega t)$ generated by the sine wave generator 15 and the output current $I_O$ with a multiplication process, so as to output a command reference active power $P_O$ to a power-voltage reducing processor 131 of the controlling and processing module 13. On the other hand, the phase shifting circuit 1C coupled to the sine wave generator 15 converts the sine wave signal $\sin(\omega t)$ to a cosine wave signal $\cos(\omega t)$ at the same time, and then the multiplier 1D coupled to the phase shifting circuit 1C treats the cosine wave signal $\cos(\omega t)$ and the output current $I_O$ with a multiplication process, so as to output a command reference reactive power $Q_O$ to a reactive power-frequency reducing processor 132 in the controlling and processing module 13.

After receiving command reference active power $P_O$, the power-voltage reducing processor 131 would calculate a command reference voltage $V_O$ of the output current $I_O$, and the reactive power-frequency processor 132 would calculate a command reference frequency $\omega_o$ of the output current $I_O$ after receiving the command reference reactive power $Q_O$. Therefore the command reference frequency $\omega_o$ would be further transmitted to the sine wave generator 15a, and then the sine wave generator 15a outputs a reference sine wave signal $\sin(\omega_o t)$ according to the command reference frequency $\omega_o$.

After that, the multiplier 16 coupled to the controlling and processing module 13 and the sine wave generator 15a would treat the command reference voltage $V_O$ and the reference sine wave signal $\sin(\omega_o t)$ with a multiplication process, and then output a primary reference output voltage Von*. On the other hand, the visual resistor algorithmic processor 14 coupled to the loads 3 and the battery modules 2 would processes the load currents $I_L$ received from the loads 3 and the charge state currents $I_{SOC}$ received from the battery modules 2, so as to output a secondary reference output voltage $Vo_{n\_S}^*$. Therefore, the voltage combining processor 17 coupled to the visual resistor algorithmic processor 14 and the multiplier 16 receives the primary reference output voltage $V_{on}^*$ and the secondary reference voltage $V_{on\_S}^*$ at the same time, such that the voltage combining processor 17 combines the primary reference output voltage $V_{on}^*$ and the secondary reference output voltage $V_{on\_S}^*$, so as to output a reference output voltage $V_O^*$.

Continuously, the proportional amplifier 18 coupled to the voltage combining processor 17a converts the combination voltage to a reference current $I_L^*$. Therefore, the current combining processor 19 coupled to the loads 3 and the proportional amplifier 18 would for combine the load currents $I_L$ and the reference current $I_L^*$ to a combination current. Eventually, according to the combination current, the PWM signal generator 10 coupled to the proportional amplifier 18 and the loads 3 is able to generate a PWM driving signal for driving at least one switch circuit of the inverters 11, so as to properly distribute the intensity and output ratio of all the output currents $I_O$ of the inverters 11.

Based on above descriptions, it is able to know that, when the connection of the renewable energy generating systems 5 and the battery modules 2 is cut off, the inverter system 1 proposed by the present invention can still automatically distribute and modulate the output currents $I_O$ supplied to the loads 3 according to the charge states of battery modules 2 and immediate load currents $I_L$. For example, as shown in FIG. 1, when it detects the first charge state current $I_{SOC1}$ is too low, the first output current $I_{O1}$ would be reduced; and oppositely, when it detects the second charge state current $I_{SOC2}$ still keeps at high level, the second output current $I_{O2}$ would be increased. Therefore, the electric power provided by the battery modules 2 can be effectively utilized and the lifetime of the battery modules 2 mat be extended.

Thus, above descriptions have been completely and clearly introduced the inverter system 1 for energy-storing microgrid of the present invention. Next, a controlling method for the inverter system 1 will be introduced in follows. Please refer to FIGS. 3A and 3B, there are shown flow charts of a controlling method for inverter system according to the present invention. As shown in FIG. 1, FIG. 2, FIG. 3A, and FIG. 3B, the controlling method firstly executes steps (S01) and (S01a), wherein the step (S01a) is executed for receiving at least one charge state current $I_{SOC}$ from at least one battery module 2 and at least one load current $I_L$ from at least one load 3, so as to calculate a secondary reference output voltage $V_{on\_S}^*$ by way of a visual resistor algorithm. On the other hand, the step (S01) is executed for detecting and receiving an output current $I_O$ form at least one inverter 11 disposed between the at least one battery module 2 and the at least one load 3.

After the step (S01) is completed, the method is proceeded to steps (S02) and (S02a), wherein the step (S02) is executed for calculating a command reference voltage $V_O$ of the output current $I_O$ by using a power-voltage reducing function, and the step (S02a) is executed for calculating a command reference frequency $\omega_o$ of the output current $I_O$ by using a reactive power-frequency reducing function. After that, step (S03a) is executed for facilitating a sine wave generator 15 to generate a reference sine wave signal $\sin(\omega_o t)$ according to the command reference frequency $\omega_o$.

Therefore, the method continuously proceeds to step (S03), so as to multiply the command reference voltage $V_O$ with the reference sine wave signal $\sin(\omega_o t)$ for obtaining a primary reference output voltage $V_{on}^*$. After the step (S03) and the step (S01a) are finished, step (S04) is subsequently executed for combining the primary reference output voltage $V_{on}^*$ and the secondary reference output voltage $V_{on\_S}$ for obtaining a reference output voltage $V_O^*$. Next, in step (S05), it the reference output voltage $V_O^*$ and the command reference voltage $V_O$ are combined for obtaining a combination voltage, and then converting the combination voltage to a reference current $I_L^*$ by using a proportional amplifier 18. Finally, the method executes step (S06) in order to make a PWM signal generator 10 generate a PWM driving signal according to the reference current $I_L^*$ and the load current $I_L$, so as to drive at least one switch circuits of the at least one inverter 11 for controlling the intensity of the output current $I_O$ of the at least one inverter 11.

In the controlling method for inverter system, the step (S02) are carried out by executing a plurality of detail steps. The first detail step is step (S021), which is executed for treating the output current $I_O$ with a filtering process by using a low pass filter 1A. The second detail step is step (S022), which is executed for multiplying the output current $I_O$ with a sine wave signal sin(wt) generated by the sine wave generator 15, so as to obtain a command reference active power $P_O$. The last one detail step is step (S023), which is executed for converting the command reference active power $P_O$ to the command reference voltage $V_O$ of the output current $I_O$ through the power-voltage reducing function.

Moreover, the step (S02a) are also carried out by executing a plurality of detail steps. The first detail step is step (S021a), which is executed for treating the output current $I_O$ with a filtering process by using a low pass filter 1A, and converting a sine wave signal $\sin(\omega t)$ generated by the sine wave generator 15 to a cosine wave signal $\cos(\omega t)$. The second detail step is step (S022a), which is executed for multiplying the output current $I_O$ with the cosine wave signal $\cos(\omega t)$, so as to obtain a command reference reactive power $Q_O$. The last one detail step is step (S023a), which is executed for converting the command reference reactive power $Q_O$ to the command reference frequency $\omega_o$ of the output current $I_O$ through the reactive power-frequency reducing function.

Figure 4:
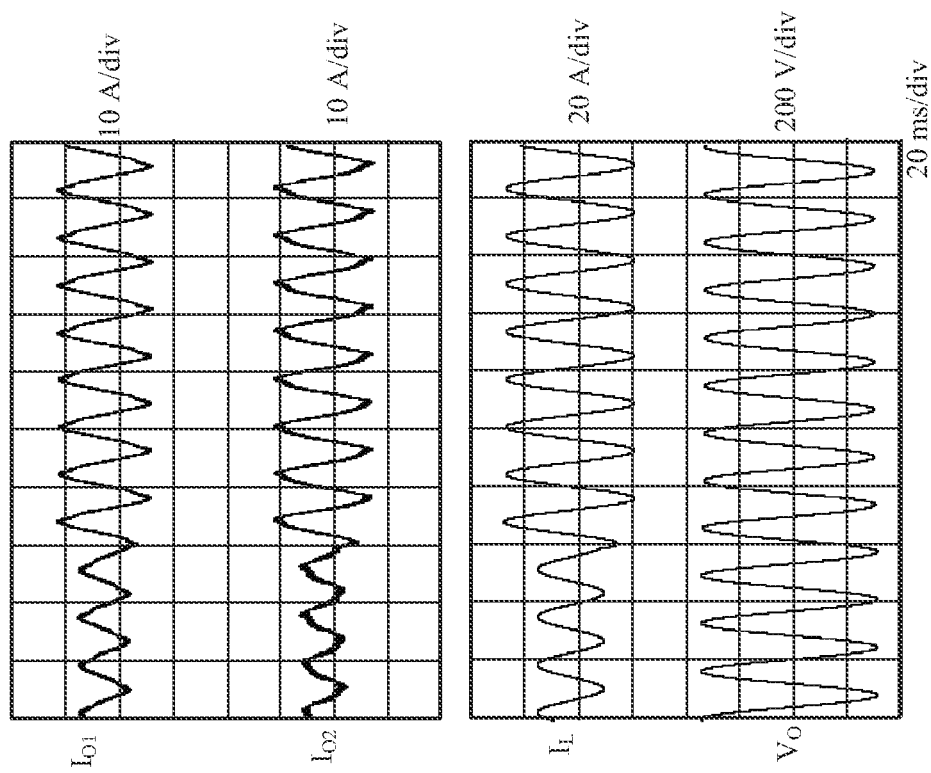
FIG. 4 shows measured waveform of the inverter system for energy-storing microgrid.
Figure 5:
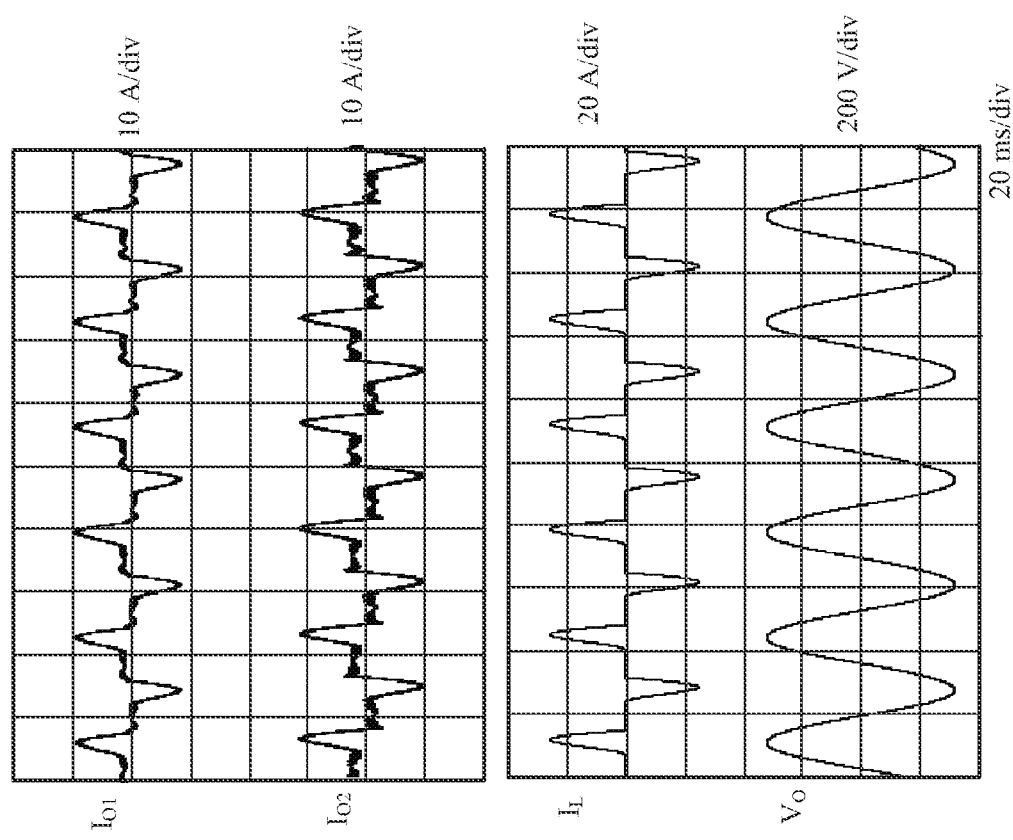
FIG. 5 shows measured waveform of the inverter system for energy-storing microgrid.

In order to prove the practicability and efficiency of the inverter system 1 for energy-storing microgrid proposed by the present invention, the waveforms of output current and output voltage of the inverter system 1 have been measured and shown in FIG. 4 and FIG. 5, wherein $I_{O1}$, $I_{O2}$, $V_O$, and $I_L$ are the first output current, the second current, the load current, and the output voltage marked in FIG. 1. Moreover, the measured current and voltage waveforms indeed prove that, when the connection of the renewable energy generating systems 5 and the battery modules 2 is cut off, the inverter system 1 proposed by the present invention can still automatically distribute and modulate the output currents $I_O$ supplied to the loads 3 according to the charge states of battery modules 2 and immediate load currents $I_L$; therefore, the electric power provided by the battery modules 2 can be effectively utilized and the lifetime of the battery modules 2 mat be extended.

The above description is made on embodiments of the present invention. However, the embodiments are not intended to limit scope of the present invention, and all equivalent implementations or alterations within the spirit of the present invention still fall within the scope of the present invention.

What is claimed is:

1. An inverter system for energy-storing microgrid, comprising:
    at least one inverter, being coupled between at least one battery module and at least one load;
    at least one detecting module, being coupled to the at least one inverter for detecting at least one output current of the at least one inverter;
    a controlling and processing module, being coupled to the at least one detecting module for receiving the output current, wherein the controlling and processing module calculates a command reference voltage of the output current by using a power-voltage reducing function, and the controlling and processing module simultaneously calculating a command reference frequency of the output current by using a reactive power-frequency reducing function;
    a sine wave generator, being coupled to the controlling and processing module for receiving the command reference frequency, so as to generate a reference sine wave signal according to the command reference frequency;
    a first multiplier, being coupled to the controlling and processing module and the sine wave generator for receiving the command reference voltage and the reference sine wave signal, so as to treat the command reference voltage and the reference sine wave signal with a multiplication process, and then output a primary reference output voltage;
    a visual resistor algorithmic processor, being coupled to the at least one load and the at least one battery module, and used for processing at least one load current received from the at least one load and at least one charge state current received from the battery module, so as to output a secondary reference output voltage;
    a first voltage combining processor, being coupled to the visual resistor algorithmic processor and the first multiplier for receiving the primary reference output voltage and the secondary reference voltage, so as to combine the primary reference output voltage and the secondary reference output voltage and then output a reference output voltage;
    a second voltage combining processor, being coupled to the first voltage combining processor and the controlling and processing module in order to receive the reference output voltage and the command reference voltage, and combine aforesaid two voltage to a combination voltage;
    a proportional amplifier, being coupled to the second voltage combining processor, and used for converting the combination voltage to a reference current;
    a current combining processor, being coupled to the load and the proportional amplifier for combining the load current and the reference current to a combination current; and
    a PWM signal generator, being coupled to the proportional amplifier and the load and used for generating a PWM driving signal according to the combination current, so as to drive at least one switch circuits of the at least one inverter.

2. The inverter system for energy-storing microgrid of claim 1, further comprising:
    a low pass filter, being coupled to the inverter for treating the output current with a filtering process;
    a second multiplier, being coupled to the low pass filter and the sine wave generator, and used for treating a sine wave signal generated by the sine wave generator and the output current with the multiplication process, and then outputting a command reference active power to the controlling and processing module;
    a phase shifting circuit, being coupled to the sine wave generator for converting the sine wave signal to a cosine wave signal;
    a third multiplier, being coupled to the low pass filter and the phase shifting circuit, and used for treating the cosine wave signal and the output current with the multiplication process, and then outputting a command reference reactive power to the controlling and processing module.

3. The inverter system for energy-storing microgrid of claim 1, further comprising at least one electric power converter, being coupled to the at least one battery module, and used for converting at least one renewable energy source provided by at least one renewable energy generating system to electric power, and then storing the electric power in the battery module.

4. The inverter system for energy-storing microgrid of claim 3, wherein the renewable energy generating system is selected from the group consisting of: wind power generating system, thermal power generating system, hydroelectric power generating system, solar power generating system, power generation system of recycling waste food, biomass power generating system, and geothermal power generating system.

5. The inverter system for energy-storing microgrid of claim 1, wherein the load is selected from the group consisting of: microgrid, motor, and energy storage device.

6. A controlling method for inverter system, comprising following steps:
    (1a) receiving at least one charge state current from at least one battery module and at least one load current from at least one load, so as to calculate a secondary reference output voltage by way of a visual resistor algorithm, and then proceeding to step (4);
    (1) detecting and receiving an output current form at least one inverter disposed between the at least one battery module and the at least one load;
    (2) calculating a command reference voltage of the output current by using a power-voltage reducing function, and then proceeding to step (3);
    (2a) calculating a command reference frequency of the output current by using a reactive power-frequency reducing function, and then proceeding to step (3);
    (3a) a sine wave generator generating a reference sine wave signal according to the command reference frequency;
    (3) multiplying the command reference voltage with the reference sine wave signal for obtaining a primary reference output voltage;
    (4) combining the primary reference output voltage and the secondary reference output voltage for obtaining a reference output voltage;
    (5) combining the reference output voltage and the command reference voltage for obtaining a combination voltage, and then converting the combination voltage to a reference current by using a proportional amplifier;

(6) a PWM signal generator generating a PWM driving signal according to the reference current and the load current, so as to drive at least one switch circuits of the at least one inverter for controlling the intensity of the output current of the at least one inverter.

7. The controlling method for inverter system of claim 6, wherein the step (2) comprise following detail steps:

(21) treating the output current with a filtering process by using a low pass filter;

(22) multiplying the output current with a sine wave signal generated by the sine wave generator, so as to obtain a command reference active power; and

(23) converting the command reference active power to the command reference voltage of the output current through the power-voltage reducing function.

8. The controlling method for inverter system of claim 6, wherein the step (2a) comprise following detail steps:

(21a) treating the output current with a filtering process by using a low pass filter, and converting a sine wave signal generated by the sine wave generator to a cosine wave signal;

(22a) multiplying the output current with the cosine wave signal, so as to obtain a command reference reactive power; and (23a) converting the command reference reactive power to the command reference frequency of the output current through the reactive power-frequency reducing function.

9. The controlling method for inverter system of claim 6, wherein the at least one battery module simultaneously coupled to at least one electric power converter, in which the least one electric power converter is used for converting at least one renewable energy source provided by at least one renewable energy generating system to electric power, and then storing the electric power in the battery module.

10. The controlling method for inverter system of claim 6, wherein the renewable energy generating system is selected from the group consisting of: wind power generating system, thermal power generating system, hydroelectric power generating system, solar power generating system, power generation system of recycling waste food, biomass power generating system, and geothermal power generating system.

11. The controlling method for inverter system of claim 6, wherein the load is selected from the group consisting of: microgrid, motor, and energy storage device.

* * * * *